United States Patent [19]

Kage

[11] Patent Number: 4,811,366
[45] Date of Patent: Mar. 7, 1989

[54] START PATTERN DETECTING APPARATUS

[75] Inventor: Kouzou Kage, Tokyo, Japan

[73] Assignee: NEC Corporation, Tokyo, Japan

[21] Appl. No.: 93,325

[22] Filed: Sep. 4, 1987

[30] Foreign Application Priority Data

Sep. 4, 1986 [JP] Japan ................... 61-206706
Sep. 4, 1986 [JP] Japan ................... 61-206707

[51] Int. Cl.$^4$ ............................................. H04C 7/00
[52] U.S. Cl. ..................... 375/116; 375/110; 370/105
[58] Field of Search ............... 375/110, 114, 115, 116; 371/42, 46, 47; 370/105, 107

[56] References Cited

U.S. PATENT DOCUMENTS 3,990,049 11/1976 Wirth ........................... 375/116 X
4,435,826 3/1984 Matsui .......................... 375/115
4,675,886 6/1987 Surie ............................ 375/116
4,719,643 1/1988 Beeman ........................ 375/115

Primary Examiner—A. D. Pellinen
Assistant Examiner—Derek S. Jennings
Attorney, Agent, or Firm—Sughrue, Mion, Zinn, Macpeak & Seas

[57] ABSTRACT

An apparatus for accurately detecting a start pattern in the event of reception of a digital signal in which the start pattern is followed by an information signal. The detection of a start pattern is performed only once while a start pattern is received so that, although a pattern analogous to the start pattern may be included in a data signal, a pattern match output is prevented from responding any further despite such a pattern. Even a start pattern having an extremely great length is detected without errors.

5 Claims, 4 Drawing Sheets

START PATTERN DETECTING APPARATUS

BACKGROUND OF THE INVENTION

The present invention relates to an apparatus for detecting a start pattern and, more particularly, to an apparatus for accurately detecting a start pattern in the event of reception of a digital signal in which the start pattern is followed by a data signal.

A prerequisite with the processing of a received data signal is detecting the starting point of the data signal as defined by a start pattern. A start pattern, therefore, has to be detected accurately without errors. Usually, the length of a start pattern is increased in proportion to the significance of a data signal for the purpose of promoting accurate detection of a start pattern. Such, however cannot be implemented without the need for hardware of considerably large scale. Specifically, in a prior art apparatus for the detection of a start pattern, a start pattern is provided with a substantial length so as not to detect a start pattern out of noise which is included in received data, resulting in an impracticably large circuit scale.

SUMMARY OF THE INVENTION

It is, therefore, an object of the present invention to provide a start pattern detecting apparatus capable of accurately detecting a start pattern included in received data in which the start pattern is followed by a data signal.

It is another object of the present invention to provide a start pattern detecting apparatus having a simple circuit arrangement.

It is another object of the present invention to provide a generally improved start pattern detecting apparatus.

An apparatus for detecting a start pattern included in received data in which an information signal follows the start pattern of the present invention comprises a pattern recovery circuit for recovering the start pattern, an electronic switch for selecting one of the received data and an output of the pattern recovery circuit at a time and applying the received signal or the output of the pattern recovery circuit selected to the pattern recovery circuit, a decision circuit for determining whether or not the output of the pattern recovery circuit and the received data are identical in pattern and, when decided not identical, generating a control signal for causing the electronic switch to select the received data, a match detection circuit for performing pattern matching on a pattern which is recovered by the pattern recovery circuit, and an output circuit for producing an output signal in response to an output of the match detection circuit when the decision circuit decides that the output of the pattern recovery circuit and the received data are identical in pattern.

The above and other objects, features and advantages of the present invention will become more apparent from the following detailed description taken with the accompanying drawings.

DESCRIPTION OF THE PREFERRED EMBODIMENTS

To better understand the present invention, a brief reference will be made to a prior art start pattern detecting apparatus, i.e., a circuit for detecting a start pattern out of received data, shown in FIG. 1. For the simplicity of description, a start pattern is assumed to be "11001" the number of bits n of which is five. In this particular example, the allowable number of errors r is one, meaning that a detection output is produced and fed out through an output terminal even if one bit of error is present. In detail, the prior art apparatus, generally 10, includes a shift register 12 the number of bits n of which is five. Namely, the shift register 12 accommodates five bits of received data RD, AND gates 14(1) to 14(5) individually produce a (logical) ONE even if one bit of error exists in a start pattern, which is included in the received data. An OR gate 16 produces an output signal MATCH, or a ONE, when any of the AND gates 14(1) to 14(5) applies a ONE to the OR gate 16. Inverters 18(1) and 18(2) are provided so that when a start pattern is stored in the shift register 12, the inputs to all of the AND gates 14(1) to 14(5) may become a ONE.

Figure 1:
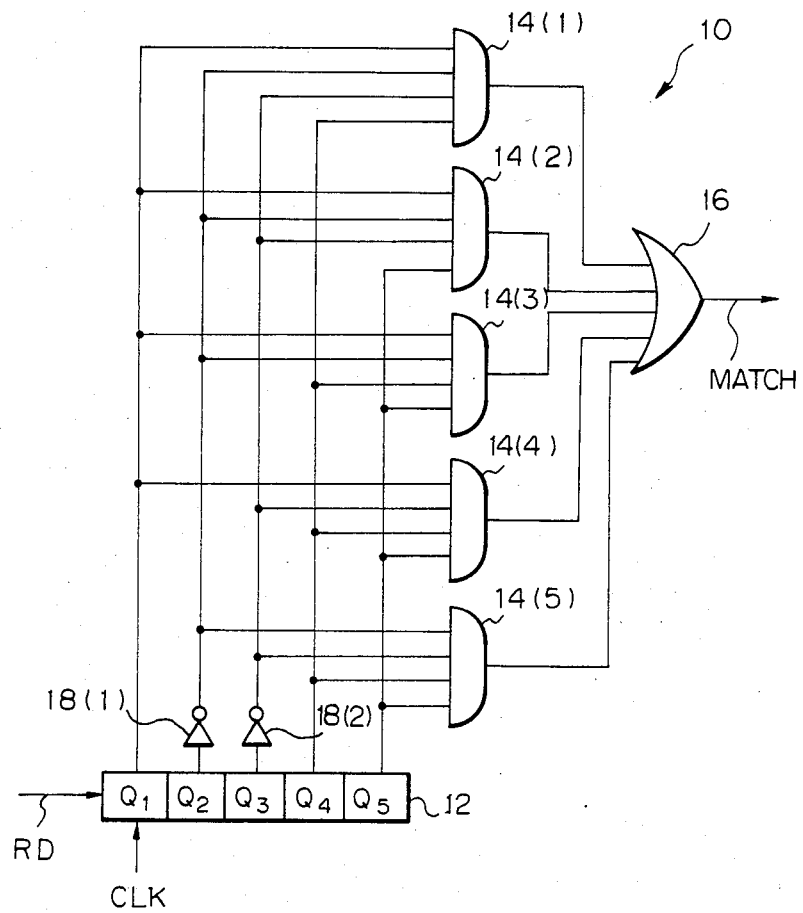
FIG. 1 is a circuit diagram showing a prior art start pattern detecting apparatus.

Although the apparatus of FIG. 1 may readily be implemented because the number of bits n of the start pattern is as small as five, the probability that it decides received data RD which is not a start pattern to be a start pattern is considerably high. Assume that noise comes in as the received data RD despite that a signal is not being received; in the case of an FM (Frequency Modulation) receiver, a noise condition is developed while the receiver is not receiving a signal. Then, the probability which the prior art apparatus detects a 5-bit start pattern out of that entirely random noise under the one-bit allowability condition is expressed as:

$$Pd = \frac{1}{2}^5 + 5 \times \frac{1}{2}^5 = 3/16$$

This implies that the false detection stated above occurs three times per sixteen bits. Hence, despite the fact that no signal is being received, the apparatus detects a start pattern included in noise with a high probability, resulting in erroneous processing.

In the light of this, there may be used a start pattern the number of bits n of which is 100, and an allowable number r of error bits which is three. In this instance, the probability Pd that a start pattern is found in a noise condition is produced by:

$$Pd = \frac{1}{2}^{100} + {}_{100}C_1/2^{100} + {}_{100}C_2/2^{100} + {}_{100}C_3/2^{100} \approx {}_{100}C_3/2^{100} \approx 1.27 \times 10^{-25}$$

Thus, the probability of false detection is low. However, as regards a circuit for implementing such an approach, the AND gates 14(1) to 14(5) shown in FIG. 1 have to be replaced with as many as 161,700 ($_{100}C_3$) AND gates each having 97 inputs, resulting in a prohibitively large circuit scale.

Figure 2:
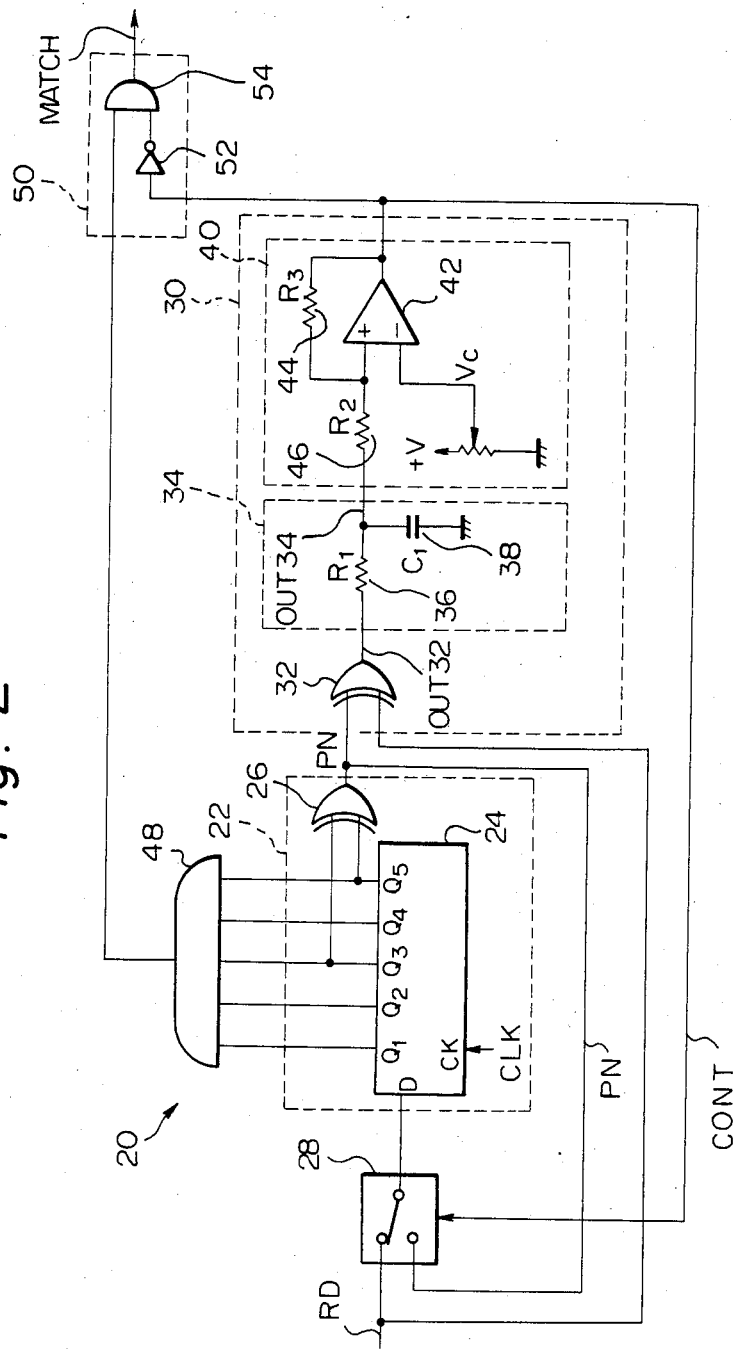
FIG. 2 is a circuit diagram showing a start pattern detecting apparatus in accordance with the present invention.

Referring to FIG. 2, a start pattern detecting apparatus embodying the present invention which solves the above-discussed problem is shown and generally designated by the reference numeral 20. As shown, the apparatus includes a pattern recovery circuit 22 which is made up of a 5-bit shift register 24 and an Exclusive-OR (EX-OR) gate 26. An electronic switch 28 is connected to the 5-bit shift register 24 for selecting either one of received data and a PN (Pseudo Noise) signal which is output by the pattern recovery circuit 22. In this particular embodiment, when the electronic switch 28 selects the PN signal from the pattern recovery circuit 22, the pattern recovery circuit 22 produces a 5-bit PN signal (period=$2^5-1=31$ bits). The electronic switch 28 is controlled by a control signal CONT which is output by a decision circuit 30. Specifically, when the PN signal from the pattern recovery circuit 22 and the received data RD are matched, the decision circuit 30 applies a (logical) ZERO to the switch 28 as the control signal CONT causing the switch 28 to select the PN signal.

The decision circuit 30 includes an EX-OR gate 32 to which the PN signal from the pattern recovery circuit 22 and the received data RD are applied. If the PN signal and the received data RD are matched, the EX-OR gate 32 produces a ZERO on its output OUT 32. This output OUT 32 is routed through a resistor 36 having resistance $R_1$ and a capacitor 38 having capacitance $C_1$ for the purpose of suppressing flucuation i.e., the resistor 36 and capacitor 38 cooperate to constitute a low-pass filter (LPF) 34. Here, the time constant $R_1C_1$ of the LPF 34 is selected to be sufficiently greater than the time width of one bit. The output OUT 34 of the LPF 34 is applied to a hysteresis comparator circuit 40. In this circuit 40, a comparator 42 compares the input OUT 34 with a reference voltage $V_c$. The result of comparison output by the comparator 42 is positively fed back via a resistor 44 having resistance $R_3$, whereby a hysteresis characteristic is provided. A resistor 46 has resistance $R_2$ which is selected to be relatively high to prevent the output of the comparator 42 from affecting the LPF 34. Specifically, when the output OUT 32 of the EX-OR gate 32 of the decision circuit 30 becomes a ZERO which is representative of a match between the PN signal and the received data RD, the output voltage OUT 34 of the filter 34, too, becomes low. This low voltage is compared with the reference voltage by the hysteresis comparator 40 which then produces a control signal CONT which is a ZERO.

Figure 3:
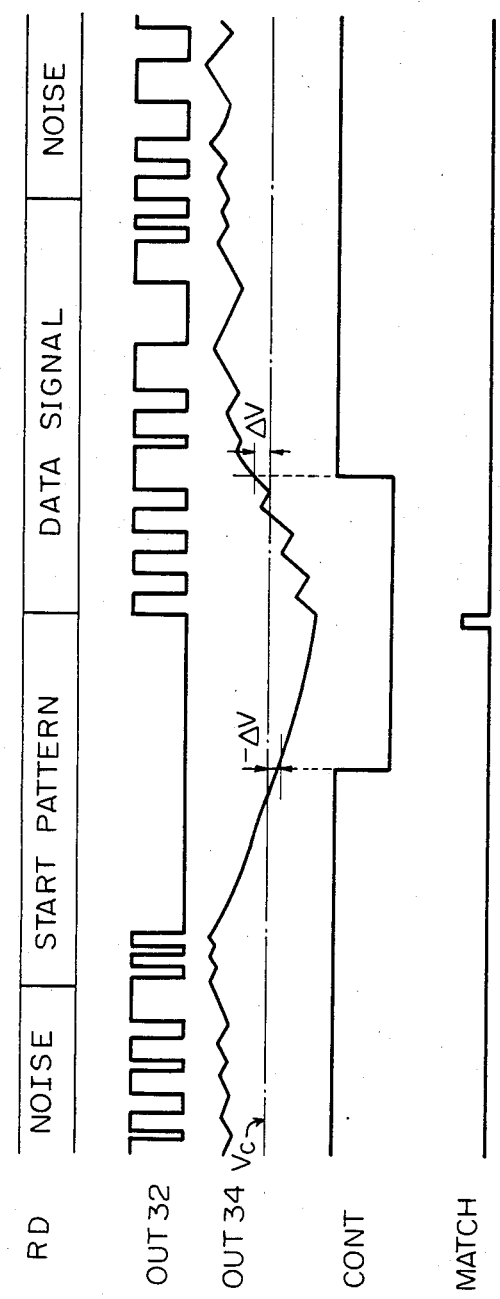
FIG. 3 is a timing chart demonstrating the operation of the apparatus as shown in FIG. 2.

The operations of the electronic switch 28, pattern recovery circuit 22 and decision circuit 30 will be described with reference to FIG. 3. As shown, while a signal is not received, the received output is in a noise condition. In such a section, since the received data RD is entirely random, it is not always coincident with a PN signal which is output by the pattern recovery circuit 22 and, hence, the output OUT 32 of the EX-OR gate 32 changes irregularly. This causes a higher voltage than the reference voltage to appear on the output OUT 34 of the LPF 34, whereby the hysteresis comparator 40 produces a ONE as the control signal CONT. Then, the electronic switch 28 is actuated by the control signal CONT to select the received data RD and feed it to the pattern recovery circuit 22.

The operation will be further described on the assumption that a 5-stage PN pattern "0001101110101000010010110011111" is received as a start pattern by way of example. When at least more than five bits of such a pattern is lodged in the shift register 24, a PN signal from the pattern recovery circuit 22 and received data RD are matched due to the nature of the pattern and, hence, the output OUT 32 of the EX-OR gate 32 becomes a ZERO. In response, the output voltage OUT 34 of the LPF 34 is lowered, as shown in FIG. 3. As the LPF output voltage OUT 34 is lowered beyonda certain level $V_c - \Delta V$ ($\Delta V$: width of hysteresis), the hysteresis comparator 40 responds by delivering a ZERO to the electronic switch 28 as the control signal CONT. Theen, the switch 28 selects the PN signal from the pattern recovery circuit 22 and generates a signal independently of the received data RD. If the PN signal and the received data RD continue to be identical in pattern, the output OUT 32 of the EX-OR gate 32 and, therefore, the output CONT of the decision circuit 30 remains at ZERO and maintaining the switch 28 in the existing condition.

Assume that while a start pattern is received, an error occurs in the received data RD by chance at the instant when the electronic switch 28 is actuated. Then, since a false pattern is input to the shift register 24, the PN signal and the received data RD are not the same in pattern as each other resulting that the output OUT 32 becomes an irregular signal. This causes the output voltage OUT 34 of the LPF 34 to become high again, so that the hysteresis comparator 40 applies to the electronic switch 28 of a control signal which is a ONE. Consequently, the switch 28 passes the received data RD to the shift register 24 again. Whether the received data RD and the PN signal output by the pattern recovery circuit 22 are identical is determined by the decision circuit 30. The procedure described so far is automatically repeated until a condition wherein the match of the PN signal and the received data RD continues stably even if the switch 28 selects the PN signal is reached.

Stated another way, so long as the match of the PN signal and the received data RD continues even if the electronic switch 28 selects the PN signal from the pattern recovery circuit 22, the received data RD may be regarded to be a start pattern which is constituted by the five-stage PN signal. In this instance, although the received data RD may involve an error, an error does not occur in the PN signal output by the pattern recovery circuit 22 at all. It follows that error-free detection is achievable if a match is detected by a match detection circuit 48 with regard to the content of the pattern recovery circuit 22, i.e. outputs $Q_1$ to $Q_5$ of the shift register 24. In the embodiment of FIG. 2, the match detection circuit 48 is implemented with an AND gate which produces a match output when all the contents of the shift register 24 are a ONE. The number of inputs of the AND gate 48 need only be equal to that of the bits of the shift register 24.

The match output is routed through an output circuit 50 to be delivered as an output signal MATCH. The output circuit 50 consists of an inverter 52 and an AND gate 54 and passes the output of the match detection circuit 48 when the control signal CONT is a ZERO.

Figure 4:
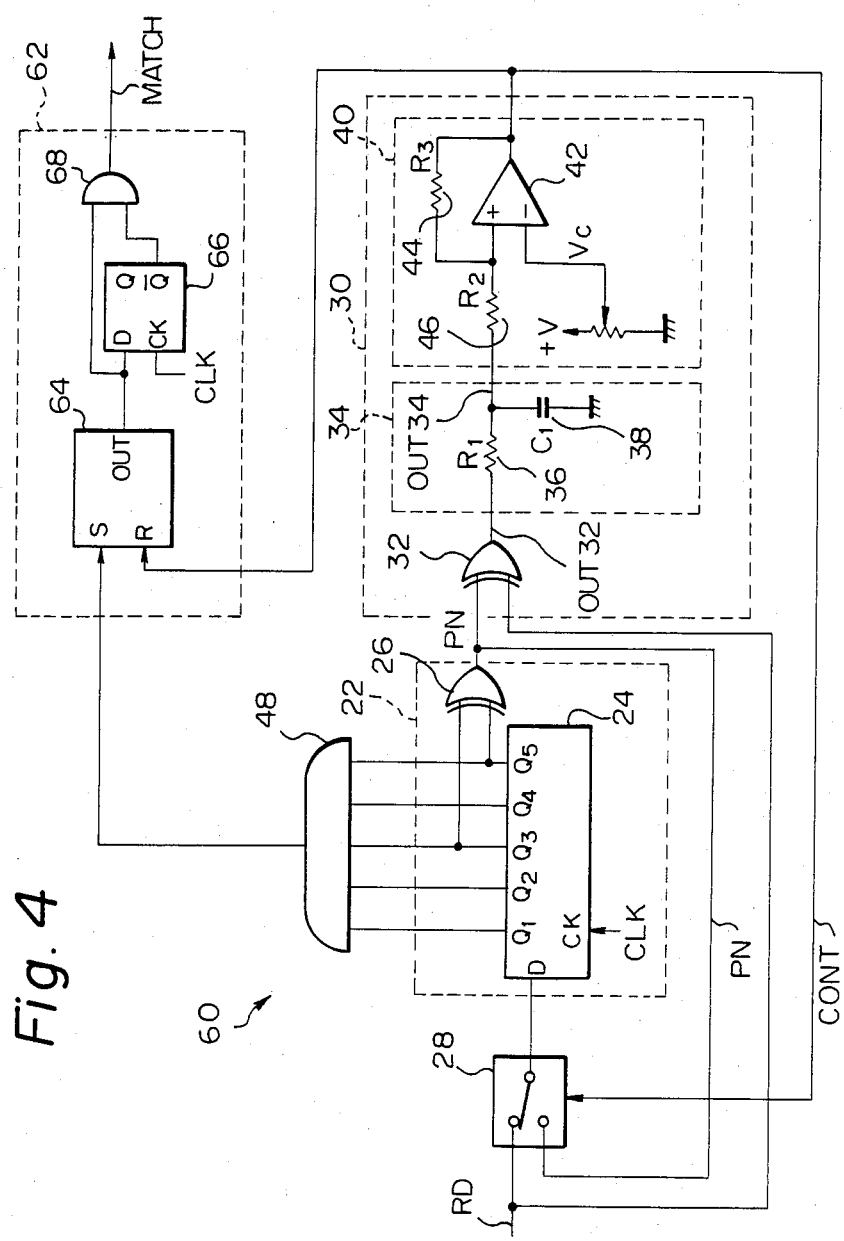
FIG. 4 is a circuit diagram showing another embodiment of the present invention.

Referring to FIG. 4, another embodiment of the present invention is shown. Since the embodiment of FIG. 4 is essentially similar to that of FIG. 2 except for the construction of the output circuit 50, the following description will mainly concentrate on the output circuit.

In the start pattern detecting apparatus 60 of FIG. 4, the match detection circuit 48 produces a match output when all the contents of the shift register 24 are a ONE, the match output being delivered via an output circuit 62. After the decision circuit 30 has decided that the PN signal from the pattern recovery circuit 22 and the received data RD are identical in pattern and, then the control signal CONT has become a ZERO, the output circuit 62 responds only to the first match output of the match detection circuit 48 by producing an output signal MATCH which is a ONE. When a pattern analogous to but not identical with the PN pattern occurs in the data signal to maintain the output CONT of the decision circuit ZERO for a long period of time, it may occur that the match detection circuit 48 responds again by producing a ONE. The output circuit 62 is installed for eliminating an occurrence that the second response and onward of the match detection circuit 48 are erroneously determined to indicate the beginnings of information.

In detail, when the output of the decision circuit 30 shows that the PN signal from the pattern recovery circuit 22 and the received data RD are not identical in pattern and, therefore, the control signal CONT is a ONE, a set-reset circuit 64 of the output circuit 62 is reset to produce a ONE. At this instant, a flip-flop 66 has a non-inverting output Q which is a ZERO and an inverting output $\overline{Q}$ which is a ONE. Assume that a match between the PN signal and the received data RD has thereafter occurred to turn the control signal CONT into a ZERO. As the output of the match detection circuit 48 rises, the set-reset circuit 64 produces a ONE. The inverting output $\overline{Q}$ of the flip-flop 66 is operated by a clock C/K and remains to be a ONE for the duration of one bit, so that a ONE is fed out via an AND gate 68 as the signal MATCH. After one bit as counted from the change of the output of the set-reset circuit 64 to a ONE, the inverting output Q of the flip-flop 66 becomes a ZERO and, hence, the output MATCH of the AND gate 68 remains to be a ZERO thereafter. So long as the control signal CONT continues to be a ZERO, even if the output of the match detection circuit 48 is changed to a ONE, the output circuit 62 does not respond and continuously produces a ZERO as the output signal MATCH because the output of the set-reset circuit 64 is still a ZERO.

The embodiments shown in FIGS. 2 and 4 have been described as using a start pattern which is a five-stage PN pattern having thirty-one bits. Even if a considerably long start pattern such as a one having 1,000 bits is used, all that is required is increasing the number of stages of the shift register 24 to ten, i.e., it is needless to scale up the circuit to a noticeable extent. As regards the operation, since the pattern recovery circuit 22 recovers a start pattern timed to received data RD and since match detection is performed on the pattern recovery circuit 22, the detection is not directly related to bit errors which may exist in received data RD. This allows a minimum of erroneous processing to occur.

Although in FIGS. 2 and 4 the decision circuit 3 is shown as comprising the LPF 34 and hysteresis comparator 40 which are analog devices, such is merely to facilitate the understanding. For example, the LPF 34 may be replaced with an up-down counter, and the hysteresis converter 40 with a digital comparator. In this alternative arrangement, the up-down counter will be constructed to up-count when the output OUT 32 of the EX-OR gate 32 is a ONE and down-count when it is a ZERO.

In summary, it will be seen that the present invention provides a start pattern detecting apparatus which is capable of detecting a start pattern without errors even if the start pattern is considerably long and, yet, with a far smaller circuit scale than the prior art. Further, since the detection of a start pattern is performed only once while a start pattern is received, a pattern analogous to a start pattern which may be included in a subsequent information signal is prevented from causing a pattern match output to respond any further.

Various modifications will become possible for those skilled in the art after receiving the teachings of the present disclosure without departing from the scope thereof.

What is claimed is:

1. An apparatus for detecting a start pattern included in received data in which an information signal follows the start pattern, comprising:
   a pattern recovering means for recovering the start pattern;
   an electronic switch means for selecting one of the received data and an output of said pattern recovering means at a time and applying the received data or the output of said pattern recovering means selected to said pattern recovering mean;
   a deciding means for determining whether or not the output of said pattern recovering means and the received data are identical in pattern and, when decided not identical, generating a control signal for causing said electronic switch means to select the received data;
   a matching detecting means for performing pattern matching on a pattern which is recovered by said pattern recovering means and generating an output in response thereto; and
   an outputting means for producing an output signal in response to an output of said match detecting means when said deciding means decides that the output of said pattern recovering means and the received data are identical in pattern.

2. An apparatus as claimed in claim 1, wherein the start pattern comprises a PN (Pseudo Noise) signal.

3. An apparatus as claimed in claim 1, wherein said outputting means comprises an inverter to which an output of said deciding means is applied, and an AND gate for producing the output signal in response to an output of said inverter and an output of said match detecting means.

4. An apparatus as claimed in claim 1, wherein said outputting means is constructed to, after said deciding means has decided that the output of said pattern recovering means and the received data are identical, produce the output signal in response only to a match output of said match detecting means which appears for the first time.

5. An apparatus as claimed in claim 4, wherein said outputting means further comprises a set-reset circuit to which an output of said deciding means and an output of said match detecting means are applied, a flip-flop to which an output of said set-reset circuit is applied, and an AND gate for producing the output signal in response to an output of said flip-flop and an output of said set-reset circuit.

* * * * *

UNITED STATES PATENT AND TRADEMARK OFFICE
CERTIFICATE OF CORRECTION

PATENT NO. : 4,811,366

DATED : 3/7/89

INVENTOR(S) : Kage

It is certified that error appears in the above-identified patent and that said Letters Patent is hereby corrected as shown below:

Column 3, line 10, delete "(period = $2^51$", insert --(period = $2^5 - 1$--;

Column 4, line 6, delete "Theen", insert --Then--;

Column 5, line 32, delete "Q", insert --$\overline{Q}$--;

Column 5, line 55, delete "circuit 3", insert --circuit 30--;

Column 6, line 32, delete "a matching", insert --a match--.

Signed and Sealed this

First Day of October, 1991

Attest:

HARRY F. MANBECK, JR.

Attesting Officer

Commissioner of Patents and Trademarks